United States Patent
Kovalchuk et al.

(10) Patent No.: US 11,525,341 B2
(45) Date of Patent: Dec. 13, 2022

(54) EPOXY-BASED FILTRATION OF FLUIDS

(71) Applicants: Anton Kovalchuk, Houston, TX (US); Anil Sadana, Houston, TX (US); Soumya Vinod, Pearland, TX (US)

(72) Inventors: Anton Kovalchuk, Houston, TX (US); Anil Sadana, Houston, TX (US); Soumya Vinod, Pearland, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 103 days.

(21) Appl. No.: 16/919,376

(22) Filed: Jul. 2, 2020

(65) Prior Publication Data
US 2022/0003084 A1 Jan. 6, 2022

(51) Int. Cl.
*E21B 43/08* (2006.01)

(52) U.S. Cl.
CPC .................. *E21B 43/082* (2013.01)

(58) Field of Classification Search
CPC .................................... E21B 43/082
See application file for complete search history.

(56) References Cited

U.S. PATENT DOCUMENTS

| | | |
|---|---|---|
| 7,743,835 B2 | 6/2010 | Willauer |
| 7,828,055 B2 | 11/2010 | Willauer et al. |
| 7,832,490 B2 | 11/2010 | Willauer |
| 8,604,157 B2 | 12/2013 | Gerrard et al. |
| 8,672,023 B2 | 3/2014 | O'Malley |
| 8,678,100 B2 | 3/2014 | Guest et al. |
| 8,763,687 B2 | 7/2014 | Ingram et al. |
| 8,783,349 B2 | 7/2014 | Robisson et al. |
| 8,939,222 B2 | 1/2015 | Ren et al. |
| 9,068,437 B2 | 6/2015 | Carrejo et al. |
| 9,144,925 B2 | 9/2015 | Ren et al. |
| 9,260,568 B2 | 2/2016 | Ren et al. |
| 9,303,485 B2 | 4/2016 | Hecker et al. |
| 9,322,248 B2 | 4/2016 | Yeh et al. |
| 9,638,012 B2 | 5/2017 | Yeh et al. |
| 9,670,756 B2 | 6/2017 | Yeh |
| 9,850,733 B2 | 12/2017 | Fripp et al. |
| 9,878,486 B2 | 1/2018 | Liu et al. |
| 10,138,701 B2 | 11/2018 | Fripp et al. |
| 10,508,185 B2 | 12/2019 | Murugesan et al. |
| 10,577,897 B2 | 3/2020 | Flores Perez et al. |
| 2014/0020910 A1 | 1/2014 | Falkner et al. |
| 2014/0332220 A1 | 11/2014 | Garza et al. |
| 2015/0361760 A1 | 12/2015 | McClung, III |
| 2016/0160617 A1* | 6/2016 | Garza ..................... E21B 23/00 166/278 |
| 2017/0009552 A1* | 1/2017 | Fripp ......................... C08J 5/00 |

(Continued)

*Primary Examiner* — Robert E Fuller
(74) *Attorney, Agent, or Firm* — Cantor Colburn LLP

(57) ABSTRACT

A fluid control device includes a support structure configured to be deployed in a borehole and a filtration component disposed at the support structure. The filtration component includes a porous medium made from a shape memory epoxy, the shape memory epoxy including a soft segment monomer and a hard segment monomer, the porous medium configured to be compacted from an initial shape to a compacted shape, deployed in the borehole, and subsequently expanded due to a downhole temperature to conform to a surface of the borehole.

20 Claims, 4 Drawing Sheets

(56) References Cited

U.S. PATENT DOCUMENTS

| | | |
|---|---|---|
| 2017/0044880 A1 | 2/2017 | Yeh et al. |
| 2017/0356269 A1* | 12/2017 | Denton ............... E21B 33/1208 |
| 2019/0292877 A1 | 9/2019 | Flores Perez et al. |
| 2022/0003081 A1 | 1/2022 | Kovalchuk |

* cited by examiner

EPOXY-BASED FILTRATION OF FLUIDS

BACKGROUND

Various tools are utilized in subterranean operations, such as hydrocarbon exploration, drilling and completion operations, to increase or maximize production efficiency. Sand control devices such as sand screens are utilized to control the ingress of particulate contaminants into production fluid and to aid in stabilizing production formations. Examples of sand control devices include screen assemblies having conformable sleeves or components that are expanded downhole. In some cases, high temperature conditions experienced downhole can affect the performance such sand control devices.

BRIEF DESCRIPTION OF THE INVENTION

An embodiment of a fluid control device includes a support structure configured to be deployed in a borehole and a filtration component disposed at the support structure. The filtration component includes a porous medium made from a shape memory epoxy, the shape memory epoxy including a soft segment monomer and a hard segment monomer, the porous medium configured to be compacted from an initial shape to a compacted shape, deployed in the borehole, and subsequently expanded due to a downhole temperature to conform to a surface of the borehole.

An embodiment of a fluid control method includes deploying a fluid control device in a borehole, the fluid control device including a support structure and a filtration component disposed at the support structure, the filtration component including a porous medium made from a shape memory epoxy, the shape memory epoxy including a soft segment monomer and a hard segment monomer, where the fluid control device is deployed when the porous medium is in a compacted shape. The method also includes activating the porous medium to cause the porous medium to expand due to a downhole temperature, and conform to a surface of the borehole, and flowing a fluid through the porous medium and filtering undesirable material from the fluid.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
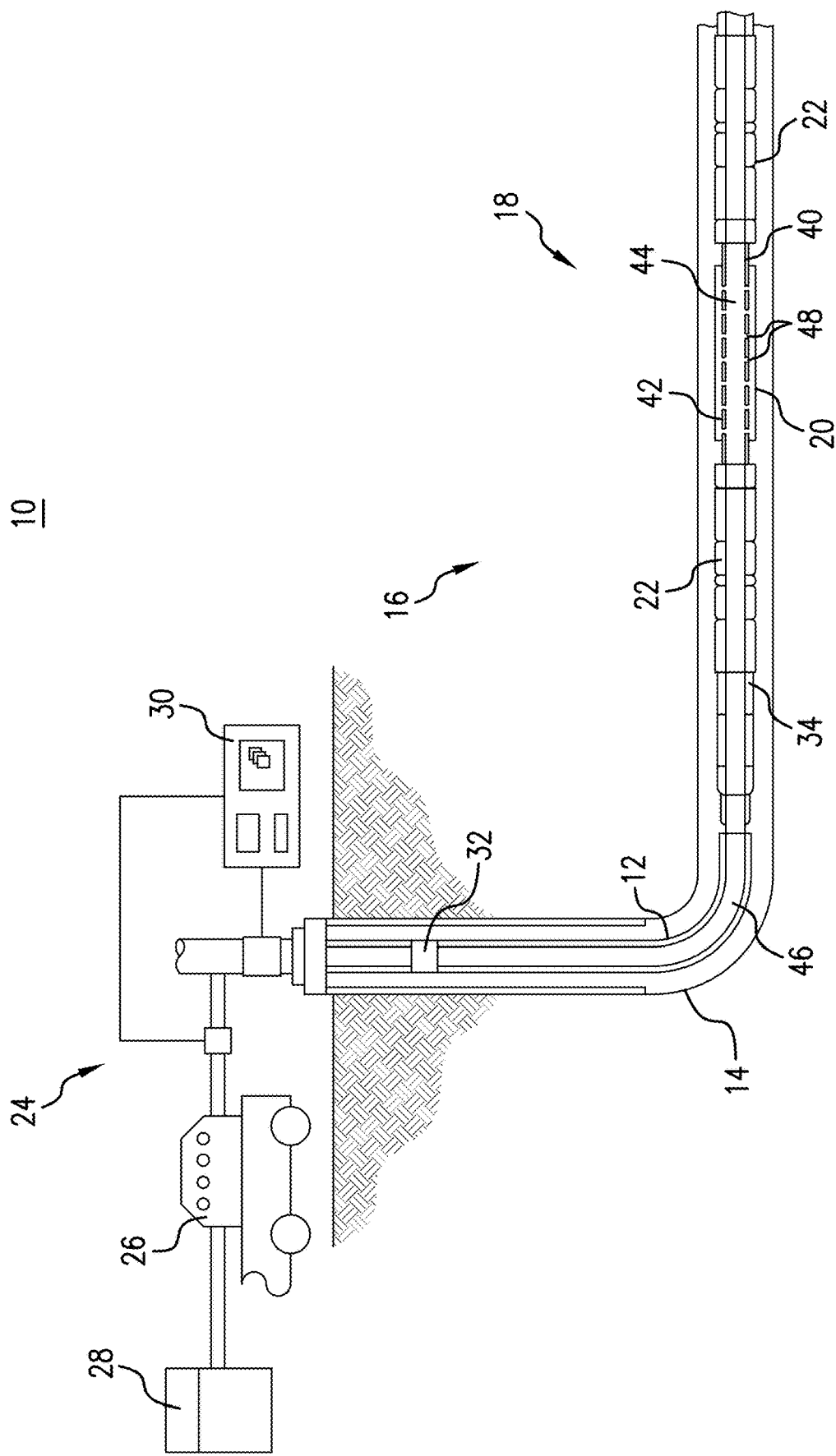
FIG. 1 depicts an embodiment of a downhole completion and/or production system including an expandable and conformable screen assembly.

Devices, systems and methods for filtering fluid (e.g., filtering sand and other undesirable material from fluid in a downhole environment) are described herein. An embodiment of a fluid control device or tool includes a porous filtration medium made from a shape memory epoxy polymer. The shape memory epoxy polymer, in one embodiment, forms a porous structure that allows fluid to flow through the structure while blocking undesirable materials. For example, the epoxy polymer (also referred to as the epoxy) is included in a fluid control device such as a sand screen, for filtering fluid entering the fluid control device, e.g., production fluid including formation fluids such as oil and hydrocarbon gas. The shape memory characteristics of the epoxy polymer allow for the filtration medium to be configured as an expandable and conformable sand screen or other fluid control device.

The shape memory epoxy polymer is a multi-component epoxy formulation (e.g., an epoxy resin) that is created from a mixture of monomers, which includes at least one soft segment monomer and at least one hard segment monomer. The mixture can be cured or solidified using a curing agent to create an epoxy polymer having soft segments and hard segments, which together provide for beneficial characteristics, including heat resistance (e.g., resistance to downhole temperatures), chemical resistance and shape memory behavior. The type and proportion of each monomer is selected to produce the above characteristics.

The shape memory epoxy may be created from a monomer mixture that includes a soft segment monomer material having one or more types of soft segment monomers, and a hard segment monomer material that includes multiple hard segment monomers. In one embodiment, the hard segment monomer material includes a first hard segment monomer (e.g., a difunctional bisphenol) and a second hard segment monomer. In one embodiment, the second hard segment monomer is polyfunctional monomer having a functionality of greater than two (i.e., a trifunctional or higher monomer). For example, the second hard segment monomer is tetrafunctional monomer.

In one embodiment, the filtration medium is formed as an open cell foam that at least partially surrounds a base pipe or other support structure. Fluid entering a borehole from a subterranean region into an annulus flows through the filtration medium and into a fluid conduit in fluid communication with the surface, while sand and other particulates, as well as larger solids, are prevented from entering the fluid conduit. The screen assembly may include one or more layers of the filtration medium, either alone or in combination with one or more additional filtration layers or devices, such as perforated sleeves, wire mesh, bead screens and/or others.

Embodiments described herein present a number of advantages. The multi-component epoxy materials described herein may be formed into various kinds of porous structures. Due to its high chemical and heat resistance, and shape memory properties, filtration medium including the shape memory epoxy can be deployed in high temperature downhole environments and efficiently perform sand filtration functions. In addition, in some embodiments, the filtration medium can survive for extended periods of time (e.g., at least 10 years).

The epoxy based filtration media described herein exhibit good heat resistance (e.g., at temperatures up to about 275 degrees F., or higher). The media combine shape memory properties and high service temperatures, as well as good mechanical properties, permeability and resistance to chemical degradation. The filtration media and screen assemblies described herein can thus be used in higher temperature environments than conventional screens and conventional shape memory devices, and may be a viable alternative to gravel packing systems. Furthermore, the filtration media and screen assemblies can be made with conventional materials, and can be manufactured easily, using both conventional manufacturing processes and other processes as described herein.

FIG. 1 depicts an example of a system 10 configured to perform a subterranean operation, and illustrates an example of a screen assembly including a conformable and expandable porous filtration medium including a shape memory epoxy. The system 10 in this example is a resource or energy production system 10 that includes a borehole string 12 disposed in a borehole 14 extending into a subterranean region or a resource bearing formation, such as an earth formation 16. It is noted that the porous filtration medium is not limited to this example, and can be incorporated into any suitable downhole device or component.

The borehole string 12 includes a completion string having a production assembly 18. The production assembly 18 includes a screen assembly 20, and may also include a flow control device such as an inflow control device (ICD). The production assembly 18 may include additional components, such as one or more packer assemblies 22 configured to isolate components and/or zones in the borehole 12.

The system 10 also includes surface equipment 24 such as a drill rig, rotary table, top drive, blowout preventer and/or others to facilitate deploying the borehole string 12, operating various downhole components, monitoring downhole conditions and controlling fluid circulation through the borehole 14 and the borehole string 12. For example, the surface equipment 24 may include a fluid control system 26 including one or more pumps in fluid communication with a fluid tank 28 or other fluid source. The fluid control system 28 facilitates injection of fluids, drilling fluid (e.g., drilling mud), stimulation fluid (e.g., a hydraulic fracturing fluid), proppant, and others. The fluid control system 28 or other suitable system may be used to inject a fluid (referred to as an activation fluid) to trigger shape memory recovery as discussed in more detail below.

One or more components of the borehole string 12 may be configured to communicate with a surface location (e.g., the surface equipment 24). The communication may be wired or wireless. A processing device such as a surface processing unit 30 and/or a subsurface processing unit 32 and/or 34, which may be disposed in the borehole 14 and connected to one or more downhole components. The processing device may be configured to perform functions such as controlling downhole components, transmitting and receiving data, processing measurement data and/or monitoring operations. The processing device may also control aspects of fluid circulation and injection, such as controlling injection of an activation fluid.

The screen assembly 20 in this embodiment includes a base pipe 40 and an expandable porous filtration medium 42 having a porous structure that includes a shape memory epoxy. The porous structure may be formed exclusively by the shape memory epoxy, or formed by the shape memory epoxy in combination with other polymers and compounds (e.g., toughening agents). The filtration medium 42 is configured as a foam or other porous structure having a selected porosity. The shape memory epoxy polymer allows the medium 42 to be compressed or compacted into a compacted or run-in shape, and expanded due to downhole temperatures to an expanded shape. In the embodiment of FIG. 1, the medium 42 is configured to expand to a size or diameter sufficient to contact and conform to an annular region of the borehole 14.

The base pipe 40 defines an inner fluid conduit 44 that can be connected to a borehole string or otherwise in fluid communication with a selected location such as a surface location. For example, the inner fluid 44 is in fluid communication with a production conduit 46 connected to the surface. A plurality of holes or other fluid passages 48 provide fluid paths for fluid entering through the porous medium 42 to flow through the base pipe 40 and into the inner fluid conduit 44.

As noted above, the filtration medium 42 is made from a material or materials that include a shape memory epoxy. The shape memory epoxy includes a copolymer or mixture of multiple species of monomer, and is prepared by curing an epoxy resin having the multiple species of monomer. The epoxy resin includes at least one hard segment monomer, and at least one soft segment monomer. The combinations of hard and soft segments as described herein result in temperature resistance as well as shape memory properties. The shape memory epoxy, in one embodiment, is configured as (or forms part of) an open cell foam or other porous structure that constitutes all or part of the filtration medium 42.

A "soft segment" monomer in the case of epoxy is a linear monomer such as bisphenol A diglycidyl ether that typically has lower glass transition temperature (e.g., about 90 degrees C.). A "hard segment" monomer such as novolac epoxy resin provides more rigid polymer structure and higher glass transition temperature than soft segment monomers due to higher degree of crosslinking in a macromolecule. In a shape memory material, hard segments are responsible for the permanent shape and shape-memorizing capability, while soft segments provide elastic recovery properties: they soften upon heating above $T_g$ or harden on cooling below $T_g$.

The shape memory epoxy is made by curing a mixture of soft segment monomers and hard segment monomers. For example, a soft segment monomer, such as bisphenol A diglycidyl ether or bisphenol F diglycidyl ether, is combined with a hard segment monomer, such as a novolac epoxy resin, in one monomer mixture. The mixture may include additional soft segment and/or hard segment monomers.

The mixture may include at least a third constituent in the form of an additional hard segment monomer. The additional hard segment monomer, in one embodiment, is a functional monomer having a functionality that is greater than two (e.g., a trifunctional monomer or higher functionality monomer). In one embodiment, the additional hard segment monomer is a tetrafunctional monomer. Dual monomer mixtures and triple monomer mixtures can be reacted with a single curing agent to produce the shape memory epoxy. The resulting epoxy, once cured, can withstand high temperatures (e.g., 250-300 degrees F. or higher) and have a high glass transition temperature (e.g., 340 degrees F.), while also having high chemical resistance.

The filtration medium 42 can be compacted from an initial shape, and later activated by heating the medium 42 to a temperature above a glass transition temperature (Tg), to partially or fully recover the initial shape. For example, the medium 42 is compacted at a temperature above the glass transition temperature, and subsequently cooled to retain the compact shape (run-in shape). The screen assembly 20 can then be deployed in the borehole 12. When the screen assembly 20 reaches a temperature greater than the Tg, the porous medium 42 expands to recover all or some of the initial shape. The glass transition temperature may be any suitable temperature that is greater than a subterranean temperature. For example, the glass transition temperature may be about 100 degrees C. or greater (e.g., about 120 degrees C.). As discussed further, the glass transition temperature may be lowered (e.g., via an activation fluid or other mechanism).

The filtration medium 42 can be a single layer or multiple layers. In addition, the filtration medium can be made from one type of epoxy or multiple types (e.g., one or more layers of the same epoxy or one or more layers of different epoxies).

The filtration medium 42 may be part of a screen device or assembly that includes additional layers or filtration components. For example, the screen assembly 20 may be made from one or more layers of the filtration medium 42, in combination with one or more additional filtration elements or layers, such as metal screens, wire mesh, polymeric screens, mesh wool, bead screens, perforated sleeves and/or others.

In one embodiment, the porous filtration medium 42 is configured to be expanded via an activation fluid. The activation fluid acts to reduce the glass transition temperature of the medium to a temperature that is at or below the temperature of a downhole environment. For example, the activation fluid is configured to reduce the glass transition temperature to below about 250-300 degrees F., or other temperature level or range encountered downhole. The activation fluid is selected based on considerations including downhole temperature and desired transition temperature.

The ability to lower the transition temperature downhole allows for the filtration medium 42 to be compacted at higher temperatures, which may allow for more compaction. A suitable activation fluid can reduce glass transition temperature so that the more compaction on the surface can be done at higher temperature while achieving expansion at lower glass transition temperature downhole.

The activation fluid may be a water based fluid, such as a brine or water based drilling mud, or an oil based fluid. The fluid is configured to activate the medium 42 and expand it by lowering the Tg temporarily so that downhole temperature causes expansion. Various chemical additives may be included to control aspects of activation, including activation temperature and the rate of expansion.

Although embodiments are discussed in the context of sand control and as part of the system 10, it is to be understood that the embodiments are not so limited. The medium 42 may be configured for any desired downhole application (or surface application) and thus have any suitable shape, size, material composition and chemical composition.

The porous medium 42 can be manufactured in a number of ways. Initially, a mixture of monomers is prepared, which includes at least one soft segment monomer, and at least one hard segment monomer. In one embodiment, the mixture includes at least one soft segment monomer, and multiple hard segment monomers (also referred to as a hard segment material or mixture). The hard segment material includes, for example, a difunctional monomer in combination with a trifunctional and/or tetrafunctional monomer.

One example of a manufacturing method is a sacrificial method in which the monomer mixture is processed to create a selected porosity by mixing or blending the monomer mixture with a sacrificial filler prior to curing. For example, an epoxy resin including the mixture of monomers is combined with a soluble granular filler such as rock salt or urea (carbamide), and subsequently cured into a desired shape. The filler is then removed, e.g., by soaking the cured epoxy in water or other solvent to remove the filler, leaving pores in the epoxy Another example involves blowing carbon dioxide, nitrogen, air or other gases to create bubbles or voids prior to curing. In this method, chemical or physical blowing agents can be used to create gas bubbles within the material during the curing stage. Suitable chemical blowing agents can include sodium bicarbonate, sodium polyacrylate, azodicarbonamide and other compounds or combination thereof. These chemicals can produce gas (carbon dioxide, nitrogen, etc.) upon their thermal decomposition thus creating pores/voids within resin matrix. Physical blowing agents can include low boiling point solvents such as cyclopentane, or gases blown through the bulk of epoxy resin while curing. In a third method of manufacturing, glass spheres or other hollow bodies are blended with the resin, followed by curing and application of a compressive force to break the hollow bodies.

Figure 2:
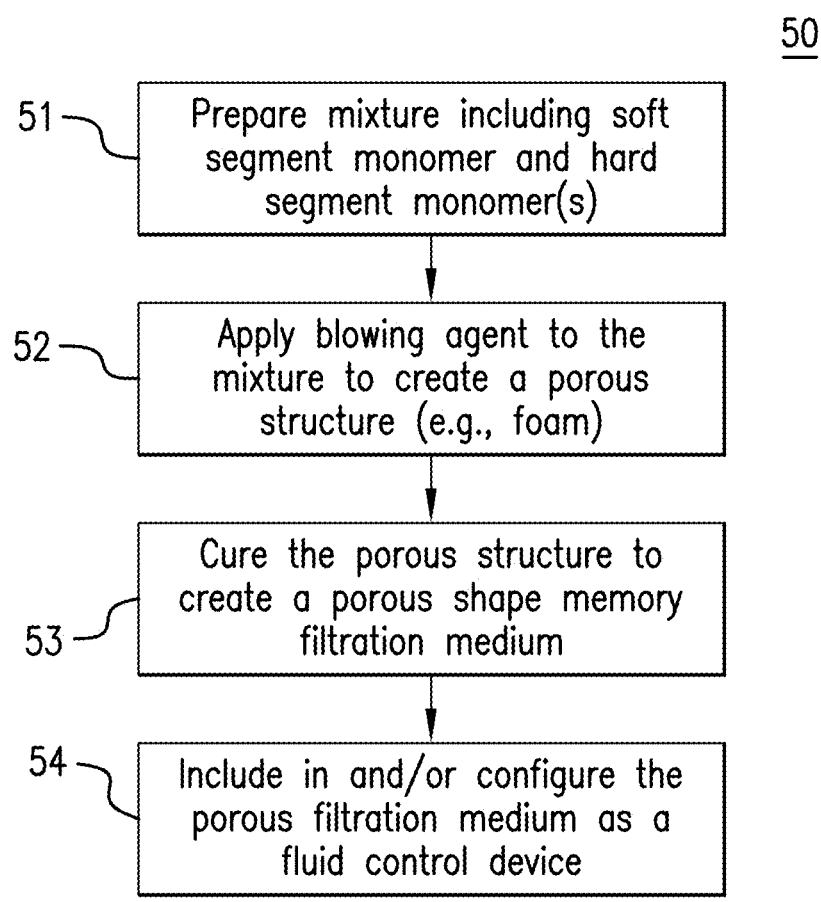
FIG. 2 is a flow diagram depicting an embodiment of a method of manufacturing a conformable filtration medium and/or a fluid control device.

FIG. 2 depicts an embodiment of a method 50 of manufacturing a porous filtration medium, such as the porous medium 42. The method 50 includes one or more stages 51-54. In one embodiment, the method 50 includes the execution of all of stages 51-54 in the order described. However, certain stages may be omitted, stages may be added, or the order of the stages changed.

At stage 51, a liquid mixture is prepared by combining monomers or resins and a curing agent.

The mixture may include additional constituents. For example, high performance heat resistant thermoplastic polymers, such as polysulfones and polyethersulfones, can be added to the mixture to improve mechanical performance (e.g., toughness and compressive strength) of the final filtration medium.

At stage 52, a blowing agent is applied to the mixture to create pores. For example, an epoxy resin or resins including the mixture is combined with a blowing agent that produces a gas in response to heat or other activation mechanism. For example, a blowing agent such as azodicarbonamide or sodium bicarbonate is combined with the mixture and then heated to cause the blowing agent to produce carbon dioxide gas that creates pores.

In one embodiment, the blowing agent includes sodium polyacrylate, alone or in combination with other blowing agents. Sodium polyacrylate has been found to have effective foaming ability. An advantage of a sodium polyacrylate blowing agent is that epoxy foams produced using this blowing agent have been found to have higher mechanical performance than those produced using other blowing agents.

Additional components or blowing agents may be combined with the sodium polyacrylate, such as sodium bicarbonate. For example, it was found that a combination of both sodium polyacrylate and sodium bicarbonate (e.g., in a 2:1 ratio) improves the homogeneity of resultant polymer foams, as compared to foams produced with only individual blowing agents.

It is noted that the use of blowing agents as described herein is not limited to epoxy materials or shape memory epoxy materials. This method and/or the use of sodium polyacrylate as a blowing agent may be used in any suitable manufacturing method or production of various polymers and combinations of polymers (e.g., polyurethane foams made from thermoplastics).

At stage 53, the porous mixture is solidified using an appropriate curing agent. The epoxy resin turns into a porous shape memory foam during the curing process.

At stage 54, the porous shape memory foam is disposed on a suitable support structure or otherwise configured as a fluid control device. For example, a cylinder or sleeve of the foam is disposed on a tubular support structure such as a perforated base pipe.

The following is a description of examples of porous shape memory epoxy polymer formulations that can be used as shape memory filtration media. These examples are listed in the following table (Table 1), which shows properties of density, compressive strength, glass transition temperature and shape recovery. It is noted that the filtration media and shape memory polymers, and monomers included therein, are not limited to the specific examples.

Table 1 also indicates a type of manufacturing method used to produce each formulation. "Method 1" is a sacrificial filler method as described above, where a mixture of monomers was combined with carbamide granules. In Method 1, 75-77% of the total weight of the combined monomer and filler material was carbamide. "Method 2" is a method that employs a blowing agent to create porosity. In Method 2, a mixture of sodium polyacrylate and sodium bicarbonate was used (30-35 parts-per-hundred-resin (phr) of sodium polyacrylate and 15-17 phr of sodium bicarbonate per 100 phr of the epoxy resin).

TABLE 1

| Formulation | Density (g/cm$^3$) | Compressive strength (psi) | $T_g$ (° C.) | Method | Shape recovery (%) |
|---|---|---|---|---|---|
| 1 | 0.180 | 230 | 148 | 1 | 95-98 |
| 2 | 0.183 | 134 | 161 | 1 | 97-100 |
| 3 | 0.197 | 218 | 175 | 2 | 93-95 |
| 4 | 0.224 | 403 | 175 | 2 | 95-98 |
| 5 | 0.249 | 416 | 174 | 2 | 95-100 |
| 6 | 0.357 | 981 | 174 | 2 | 96-99 |
| 7 | 0.381 | 983 | 175 | 2 | 95-98 |

In each of the above formulations, a shape memory epoxy was prepared from a mixture of three monomers: a soft segment monomer and two hard segment monomers. The soft segment monomer is bisphenol A diglycidyl ether (a difunctional monomer), a first hard segment monomer (a difunctional monomer) is phenol-formaldehyde polymer glycidyl ether, and a second hard segment monomer is N,N,N',N'-tetraglycidyl-4,4'-methylenebisbenzenamine, a tetrafunctional monomer. The mixture was created by combining Epon 828, Epon 862 and Alraldite MY720. Epon 828 is a standard difunctional bisphenol A diglycidyl ether, and Epon 862 is a phenol-formaldehyde polymer glycidyl ether. Araldite MY720 is a tetrafunctional epoxy resin including N,N,N',N'-tetraglycidyl-4,4'-methylenebisbenzenamine, a hard segment tetrafunctional monomer that improves heat resistance of the final polymer. All these components combined together provide a mixed network of both soft and hard segments that results in shape memory properties. The addition of a hard segment monomer such as N,N,N',N'-tetraglycidyl-4,4'-methylenebisbenzenamine helps to achieve a high Tg of the porous shape memory epoxy polymer (e.g., at least about 175° C.).

Referring to Table 1, "Formulation 1" was formed by creating a mixture of 9.81 percent by weight (wt. %) of Epon 828 epoxy resin, 9.81 wt. % of Epon 862 epoxy resin, 5.36 wt. % of Epikure W (a curing agent) and 75 wt. % of carbamide (a sacrificial filler. "Formulation 2" was formed by creating a mixture of 5.83 wt. % of Epon 828 epoxy resin, 5.83 wt % of Epon 862 epoxy resin, 5.50 wt. % of Epikure W and 77 wt % of carbamide. Formulation 2 also includes 5.83 wt % of Araldite MY720 epoxy resin (a tetrafunctional monomer).

"Formulation 3" was formed by creating a mixture of 17.25 wt. % of Epon 828 epoxy resin, 17.25 wt. % of Epon 862 epoxy resin, 17.25 wt. % of Araldite MY 720 epoxy resin, 16.27 wt. % of Epikure W. Formulation 3 also incorporates blowing agents in the mixture, including 21.77 wt. % of sodium polyacrylate and 10.20 wt % of sodium bicarbonate.

"Formulation 4" has the same composition as Formulation 2, with the addition of glass filament fibers as reinforcement. "Formulation 5" has the same composition as Formulation 2, with the addition of polyethersulfone as a toughening additive. "Formulation 6" has the same composition as Formulation 2, with the addition of reinforcement fibers and polyethersulfone. "Formulation 7" has the same composition as Formulation 2, with the addition of reinforcement fibers.

Incorporation of a toughening agent such as polyethersulfone helps to preserve mechanical strength of the epoxy foam after shape recovery. For example, addition of 10 wt. % of polyethersulfone to the epoxy resin helps to prevent losses of mechanical strength and integrity without sacrificing shape memory properties of the final material. The toughening agent may be any engineering thermoplastic configured to be dissolved in an epoxy monomer or monomer blend prior to curing.

FIGS. 3A-3C and FIGS. 4A-4C depict examples of porous shape memory epoxy polymers that may be used as filtration media. In these examples, the shape memory epoxies are in the form of open cell foams. It is noted that the epoxies may take any form that provides fluid paths that allow fluid to enter a production conduit or other location. Examples of such forms include closed cell foam, foam having both open and closed cells, a lattice, interweaved fibers or other elongated members, perforated plates or sleeves, and others.

Figure 3A:
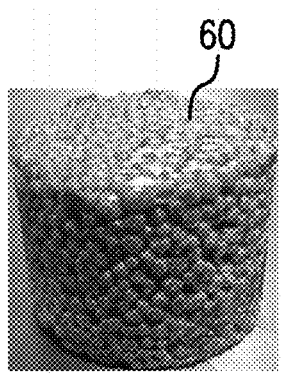
FIGS. 3A-3C depict an example of a conformable filtration medium made from a shape memory epoxy, which can be incorporated into a filtration device or component.
Figure 3B:
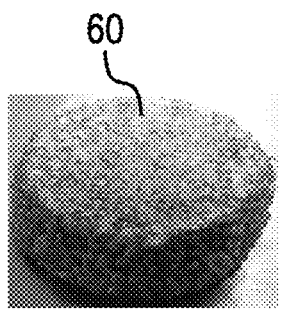
Figure 3C:
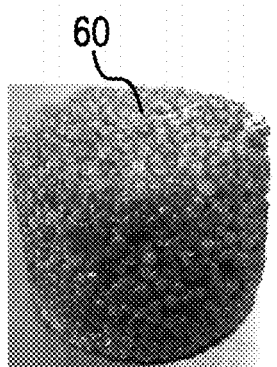

FIGS. 3A-3C show an example of a porous shape memory epoxy 60 made from Formulation 1 and manufactured according to a sacrificial filler method (Method 1). FIG. 3A shows the epoxy 60 in an initial state and having an initial shape and size. As shown in FIG. 3B, the epoxy 60 was then compacted at a temperature of about 180 degrees C. to a run-in shape or compacted shape, in which the volume was reduced by 58% of the initial volume. The compacted epoxy 60 was heated to about 120 degrees C. in a 3% KCl solution. This heating caused the epoxy 50 to recover about 97% of the original volume (FIG. 3C).

Figure 4A:
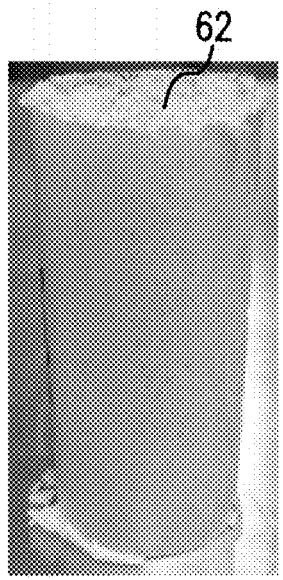
FIGS. 4A-4C depict an example of a conformable filtration medium made from a shape memory epoxy, which can be incorporated into a filtration device or component.
Figure 4B:
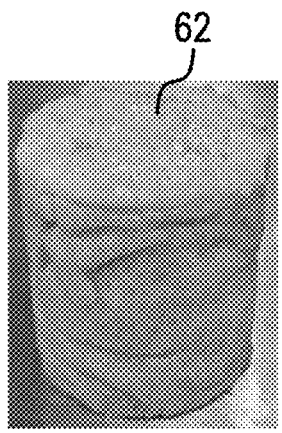
Figure 4C:
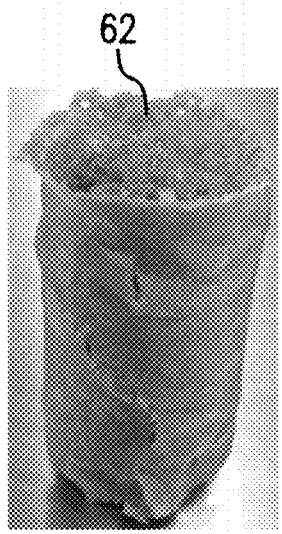
Figure 5:
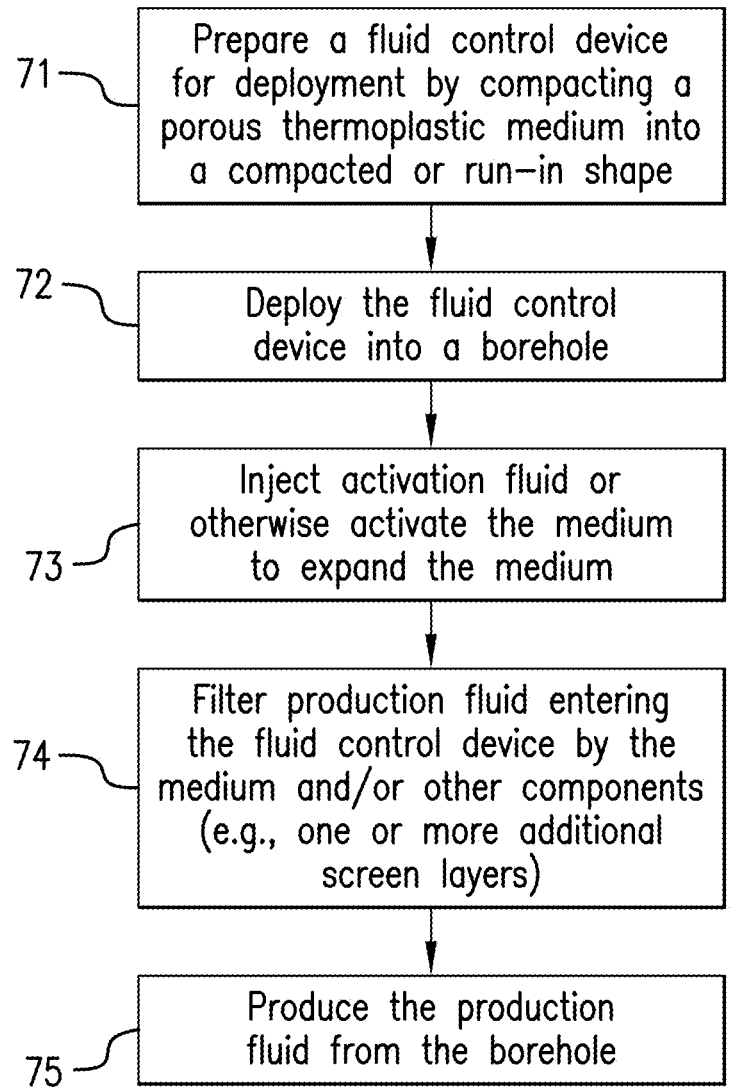
FIG. 5 is a flow diagram depicting a method of controlling fluid flow in a borehole, and/or performing aspects of a downhole or subterranean operation.

FIGS. 4A-4C show an example of a porous shape memory epoxy 62 made from Formulation 3 and manufactured using a blowing agent (Method 2). FIG. 4A shows the epoxy 62 in an initial state and having an initial shape and size. The epoxy 62 was then compacted at a temperature of about 200 degrees C. to a run-in shape or compacted shape, in which the volume was reduced by 49% (FIG. 4B). After heating to about 135 degrees C. in a 3% KCl solution, the epoxy 62 recovered 90% of its original volume (FIG. 4C).

As is demonstrated by the above examples, the filtration media and epoxies described have good shape memory properties. For example, as shown in Table 1, the epoxies had a shape recovery ratio of 93-98%, low density (about 0.20-0.40 g/cm3 depending of particular formulation), high glass transition temperatures and good mechanical properties (e.g., compressive strength of about 200-1000 psi, depending on formulation and density). Permeability of the material is in the range between 5 and 20 Darcy in the initial state (prior to compaction). The epoxies described herein can be effectively used as shape memory filtration media in high temperature downhole environments, and can fully conform to a borehole once deployed downhole and heated (e.g., to about 250-280F).

Examples of fluid permeability properties of Formulation 1 and Formulation 3 are described with reference to Table 2. Table 2 shows results of testing the permeability of Formulation 1 and Formulation 3 in water at room temperature. The permeability was tested when each formulation was in an initial state (having an initial size and shape), a compacted state, and an expanded or recovered state after shape memory recovery.

TABLE 2

| Formulation | Method | Permeability (original material), Darcy | Permeability (compacted material), Darcy | Compaction degree, % | Permeability (after shape recovery), Darcy |
| --- | --- | --- | --- | --- | --- |
| 1 | 1 | 21 | 26 | 35 | 400 |
| 3 | 2 | 2 | 21 | 32 | 32 |

The above examples show that the epoxy made from the above formulations provide sufficient permeability to be effectively used as fluid control devices for filtering sand and other undesired materials downhole. For example, in sand control applications, a permeability in the range of about 10-50 Darcy units may be desirable.

Both formulations were initially permeable to water. Formulation 1 had initial permeability of 21 Darcy, and Formulation 3 had an initial permeability of 2 Darcy units. Compaction and recovery of the materials resulted in an improvement in permeability, which may be due to compaction causing partial damage to foam cells, which further opens pore channels within the material. As shown, both formulations exhibited permeabilities sufficient for downhole use.

FIG. 6 illustrates a method 70 of controlling particulates such as produced sand in a borehole. The method is performed in conjunction with a fluid control device or tool such as the screen assembly 20. The method 70 includes one or more stages 71-75. In one embodiment, the method 70 includes the execution of all of stages 71-75 in the order described. However, certain stages may be omitted, stages may be added, or the order of the stages changed. Although the method 70 is described in conjunction with the screen assembly 20, the method can be utilized in conjunction with any suitable fluid control device or system.

In the first stage 71, at fluid control device or apparatus, such as the screen assembly 20 is prepared for deployment. A porous epoxy filtration medium as described herein (e.g., the medium or conformable sleeve 42) is disposed on a support structure, and is compacted from an initial shape to a smaller diameter shape (a compacted or run-in shape) at a temperature above the Tg of the medium. The medium is then cooled to retain the compacted shape.

In the second stage 72, the device is deployed to a subterranean environment via a borehole. For example, the screen assembly 20 in the compacted state is deployed in the borehole 14 to a selected location, such as a production zone. At this stage, the Tg of the porous medium is above the temperature at the selected subterranean location.

In the third stage 73, the filtration medium 42 is activated to cause the medium to expand into an expanded state, in which some or all of the initial or run-in shape is recovered. For example, the filtration medium 42 may have a Tg below a downhole temperature, and the medium is activated to expand and conform to a surface of the borehole 14 by exposure to a downhole temperature. In another example, the screen assembly 20 and the medium 42 is activated by injecting an activation fluid, such as a water-brine or oil-based liquid, to lower the Tg. The activation fluid causes the Tg of the medium 42 to fall below the downhole temperature, which causes the medium 42 to expand and conform to a surface of the borehole 14.

In the fourth stage 74, production is commenced, and fluid from the subterranean region is drawn through the porous medium. For example, fluid from the formation 16 is drawn through the medium 42 to filter out sand and other undesirable material. In the fifth stage 75, production fluid including fluid from the formation is produced at the surface.

Set forth below are some embodiments of the foregoing disclosure:

Embodiment 1: A fluid control device comprising: a support structure configured to be deployed in a borehole; a filtration component disposed at the support structure, the filtration component including a porous medium made from a shape memory epoxy, the shape memory epoxy including a soft segment monomer and a hard segment monomer, the porous medium configured to be compacted from an initial shape to a compacted shape, deployed in the borehole, and subsequently expanded due to a downhole temperature to conform to a surface of the borehole.

Embodiment 2: The device of any prior embodiment, wherein the shape memory epoxy includes a first hard segment monomer and a second hard segment monomer.

Embodiment 3: The device of any prior embodiment, wherein the shape memory epoxy is formed by combining a mixture of the soft segment monomer, the first hard segment monomer and the second hard segment monomer with a curing agent.

Embodiment 4: The device of any prior embodiment, wherein at least one of the first hard segment monomer and the second hard segment monomer is a tetrafunctional monomer.

Embodiment 5: The device of any prior embodiment, wherein the first hard segment monomer is a difunctional monomer and the second hard segment monomer is a tetrafunctional monomer.

Embodiment 6: The device of any prior embodiment, wherein the soft segment monomer includes bisphenol A diglycidyl ether, and the first hard segment monomer includes phenol-formaldehyde polymer glycidyl ether.

Embodiment 7: The device of claim 6, wherein the second hard segment monomer includes N,N,N',N'-tetraglycidyl-4,4'-methylenebisbenzenamine.

Embodiment 8: The device of any prior embodiment, wherein the porous medium is produced using a blowing agent, the blowing agent selected from at least one of sodium polyacrylate and sodium bicarbonate.

Embodiment 9: The device of any prior embodiment, wherein the shape memory epoxy includes a toughening additive, the toughening additive including an engineering thermoplastic configured to be dissolved in an epoxy monomer or monomer blend prior to curing.

Embodiment 10: The device of any prior embodiment, wherein the fluid control device is configured as a screen assembly, the screen assembly configured to filter undesirable material including sand from fluid entering the borehole from a subterranean region, the support structure including a tubular having a fluid conduit defined therein, the porous medium being at least one layer disposed on an outer surface of the tubular and at least partially surrounding the tubular.

Embodiment 11: A fluid control method comprising: deploying a fluid control device in a borehole, the fluid control device including a support structure and a filtration component disposed at the support structure, the filtration component including a porous medium made from a shape memory epoxy, the shape memory epoxy including a soft segment monomer and a hard segment monomer, wherein the fluid control device is deployed when the porous medium is in a compacted shape; activating the porous medium to cause the porous medium to expand due to a downhole temperature, and conform to a surface of the borehole; and flowing a fluid through the porous medium and filtering undesirable material from the fluid.

Embodiment 12: The method of any prior embodiment, wherein the fluid control device is configured as a screen assembly, the support structure includes a tubular having a fluid conduit defined therein, the porous medium includes at least one layer disposed on an outer surface of the tubular and at least partially surrounding the tubular, and the undesirable material includes sand from the subterranean region.

Embodiment 13: The method of any prior embodiment, wherein the shape memory epoxy includes a first hard segment monomer and a second hard segment monomer.

Embodiment 14: The method of any prior embodiment, wherein the shape memory epoxy is formed by combining a mixture of the soft segment monomer, the first hard segment monomer and the second hard segment monomer with a curing agent.

Embodiment 15: The method of any prior embodiment, wherein at least one of the first hard segment monomer and the second hard segment monomer is a tetrafunctional monomer.

Embodiment 16: The method of any prior embodiment, wherein the first hard segment monomer is a difunctional monomer and the second hard segment monomer is a tetrafunctional monomer or a trifunctional monomer.

Embodiment 17: The method of any prior embodiment, wherein the soft segment monomer includes bisphenol A diglycidyl ether, and the first hard segment monomer includes phenol-formaldehyde polymer glycidyl ether.

Embodiment 18: The method of any prior embodiment, wherein the second hard segment monomer includes N,N,N',N'-tetraglycidyl-4,4'-methylenebisbenzenamine.

Embodiment 19: The method of any prior embodiment, wherein the shape memory epoxy includes a thermoplastic polymer configured to be resistant to a downhole temperature.

Embodiment 20: The method of any prior embodiment, wherein the shape memory epoxy includes a toughening additive, the toughening additive including at least one of polysulfone and polyethersulfone.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fluid control device comprising:
a support structure configured to be deployed in a borehole;
a filtration component disposed at the support structure, the filtration component including a porous medium made from a shape memory epoxy, the shape memory epoxy including a mixture of a first material made from a soft segment monomer and a second material made from a first hard segment monomer and a second hard segment monomer, the first hard segment monomer having a different functionality than the second hard segment monomer, the porous medium configured to be compacted from an initial shape to a compacted shape, deployed in the borehole, and subsequently expanded due to a downhole temperature to conform to a surface of the borehole.

2. The device of claim 1, wherein the mixture forms a single material having a mixed network of the soft segment monomer, the first hard segment monomer and the second hard segment monomer.

3. The device of claim 1, wherein the shape memory epoxy is formed by combining a mixture of the soft segment monomer, the first hard segment monomer and the second hard segment monomer with a curing agent.

4. The device of claim 1, wherein at least one of the first hard segment monomer and the second hard segment monomer is a tetrafunctional monomer.

5. The device of claim 1, wherein the first hard segment monomer is a difunctional monomer and the second hard segment monomer is a tetrafunctional monomer.

6. The device of claim 5, wherein the soft segment monomer includes bisphenol A diglycidyl ether, and the first hard segment monomer includes phenol-formaldehyde polymer glycidyl ether.

7. The device of claim 6, wherein the second hard segment monomer includes N,N,N',N'-tetraglycidyl-4,4'-methylenebisbenzenamine.

8. The device of claim 1, wherein the porous medium is produced using a blowing agent, the blowing agent selected from at least one of sodium polyacrylate and sodium bicarbonate.

9. The device of claim 1, wherein the shape memory epoxy includes a toughening additive, the toughening additive including an engineering thermoplastic configured to be dissolved in an epoxy monomer or monomer blend prior to curing.

10. The device of claim 1, wherein the fluid control device is configured as a screen assembly, the screen assembly configured to filter undesirable material including sand from fluid entering the borehole from a subterranean region, the support structure including a tubular having a fluid conduit defined therein, the porous medium being at least one layer disposed on an outer surface of the tubular and at least partially surrounding the tubular.

11. A fluid control method comprising:
deploying a fluid control device in a borehole, the fluid control device including a support structure and a filtration component disposed at the support structure, the filtration component including a porous medium made from a shape memory epoxy, the shape memory epoxy including a mixture of a first material made from a soft segment monomer and a second material made from a first hard segment monomer and a second hard segment monomer, the first hard segment monomer having a different functionality than the second hard segment monomer, wherein the fluid control device is deployed when the porous medium is in a compacted shape;

activating the porous medium to cause the porous medium to expand due to a downhole temperature, and conform to a surface of the borehole; and flowing a fluid through the porous medium and filtering undesirable material from the fluid.

12. The method of claim 11, wherein the fluid control device is configured as a screen assembly, the support structure includes a tubular having a fluid conduit defined therein, the porous medium includes at least one layer disposed on an outer surface of the tubular and at least partially surrounding the tubular, and the undesirable material includes sand from the subterranean region.

13. The method of claim 11, wherein the mixture forms a single material having a mixed network of the soft segment monomer, the first hard segment monomer and the second hard segment monomer.

14. The method of claim 11, wherein the shape memory epoxy is formed by combining a mixture of the soft segment monomer, the first hard segment monomer and the second hard segment monomer with a curing agent.

15. The method of claim 11, wherein at least one of the first hard segment monomer and the second hard segment monomer is a tetrafunctional monomer.

16. The method of claim 11, wherein the first hard segment monomer is a difunctional monomer and the second hard segment monomer is a tetrafunctional monomer or a trifunctional monomer.

17. The method of claim 16, wherein the soft segment monomer includes bisphenol A diglycidyl ether, and the first hard segment monomer includes phenol-formaldehyde polymer glycidyl ether.

18. The method of claim 17, wherein the second hard segment monomer includes N,N,N',N'-tetraglycidyl-4,4'-methylenebisbenzenamine.

19. The method of claim 11, wherein the shape memory epoxy includes a thermoplastic polymer configured to be resistant to a downhole temperature.

20. The method of claim 11, wherein the shape memory epoxy includes a toughening additive, the toughening additive including at least one of polysulfone and polyethersulfone.

* * * * *